Jan. 26, 1926.　　　　　　　　　　　　　　　　　　　　　1,570,869
T. THOMSON ET AL
APPARATUS FOR FILTERING DUST LADEN GASES
Filed Sept. 12, 1925
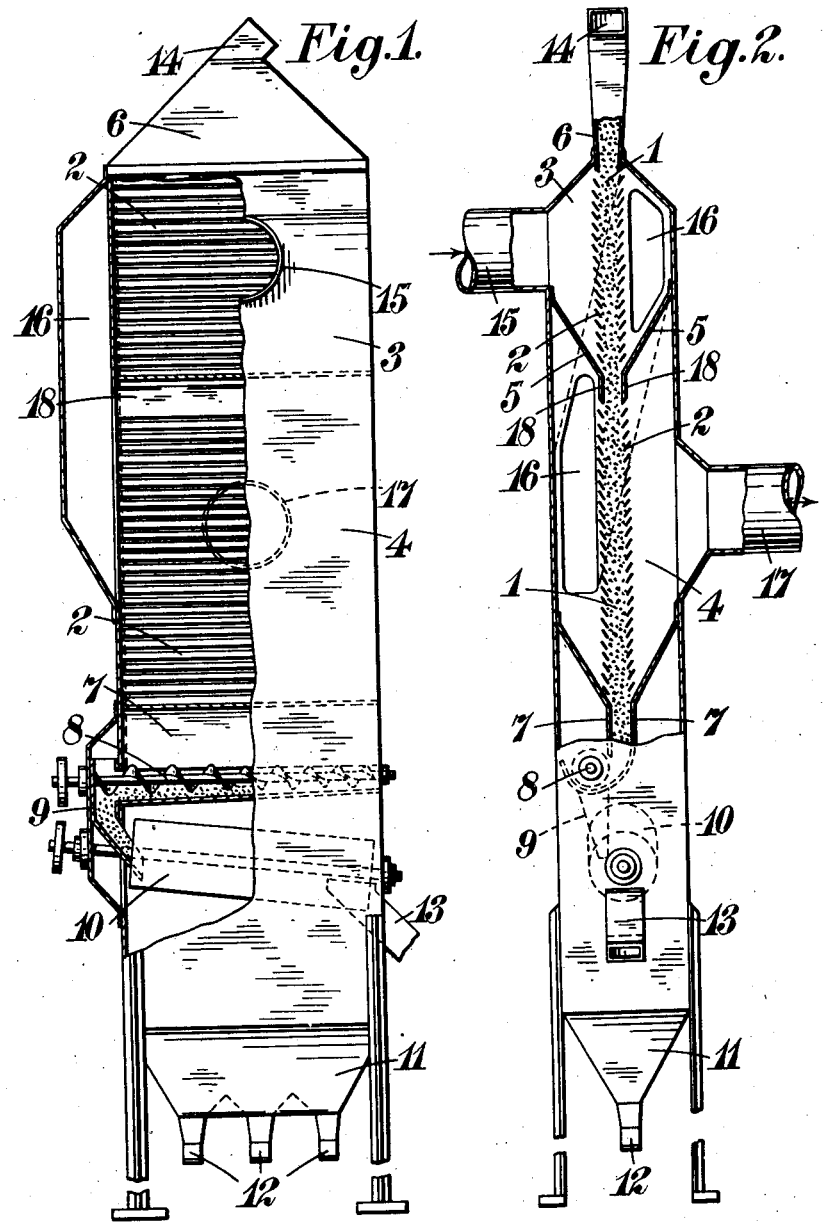

Patented Jan. 26, 1926.

1,570,869

UNITED STATES PATENT OFFICE.

THOMAS THOMSON AND NICHOLAS NISBET, OF SCUNTHORPE, ENGLAND.

APPARATUS FOR FILTERING DUST-LADEN GASES.

Application filed September 12, 1925. Serial No. 55,994.

*To all whom it may concern:*

Be it known that we, THOMAS THOMSON, residing at Scunthorpe, Lincolnshire, England, and NICHOLAS NISBET, residing at Scunthorpe, Lincolnshire, England, both subjects of the King of Great Britain, have invented certain new and useful Improvements in Apparatus for Filtering Dust-Laden Gases (for which we filed an application for patent in Great Britain on the 18th September, 1924, Serial No. 22,011); and we do hereby declare that the following is a full, clear, and exact description of the same.

This invention relates to apparatus for filtering dust laden gases, particularly those coming directly from a blast furnace, of the type in which the gases pass through a moving diaphragm comprising suitable filtering medium, in granular or coarsely powdered form, which is fed in a clean condition to the diaphragm passage between porous supports across the filtering chamber and is removed therefrom together with the intercepted particles and dust filtered from the gases, the object of the invention being to provide improvements in the method and means of operating such apparatus whereby its efficiency is increased and a finer degree of filtration may be effected.

It is found that in operation the moving diaphragm has varying filtering properties. At its entry into the filtering chamber in a clean condition it commences to retain the larger particles suspended in the gases but allows the finer dust to pass through it. During its passage across the filtering chamber its filtering properties are gradually increased owing to the particles previously intercepted acting themselves as filtering medium and reducing the size of the interstices in the diaphragm. Thus the gases passing through the diaphragm adjacent to its point of entry into the filtering chamber are filtered to a less degree than those which are treated by the portions of the diaphragm nearer to the point at which it leaves the filtering chamber and as the gases treated by the relatively coarse and fine filtering portions of the diaphragm are allowed to mingle and discharge into a common exit the degree of filtering actually obtained is a mean of the different capacities of the diaphragm. According to the present invention advantage is taken of this variable filtering property of the diaphragm and the filtering operation is performed in two or more stages of increasing fineness by passing the gases through successive portions of the same diaphragm in the same direction, each passage of the gases through the diaphragm being through a portion which is nearer to its point of entry to the filtering chamber than the succeeding one and each stage being kept separate.

This method of filtering may be effected in apparatus of the type referred to by providing a partition on both sides of the diaphragm dividing the chamber transversely into compartments. Means are also provided for admitting the gases to the compartment into which the diaphragm first enters and a conduit leads from that compartment on the other side of the diaphragm to the next compartment on the admission side of the diaphragm. The gases are extracted from the second compartment after passing through the portion of the diaphragm enclosed thereby.

The porous supports of the diaphragm are preferably made impervious at and adjacent to the junctions of the partition therewith the impervious sections of the supports extending for a sufficient distance to prevent serious by-pass of the gases along the diaphragm from one compartment to another. In filtering apparatus in which the diaphragm moves vertically downwards these impervious sections of the support may extend downwards from the partition which preferably slopes down towards the support on each side of the diaphragm in order that any solid matter falling on to the partition may be returned by gravity through the porous supports into the moving diaphragm.

In the accompanying drawing:—

Figure 1 is a sectional elevation of apparatus according to the present invention for filtering the gases in two stages.

Figure 2 is a sectional end view of Figure 1.

Like reference numerals indicate like parts throughout the drawing.

In applying the present invention to filtering apparatus of the type in which a diaphragm 1 of filtering medium in granular or coarsely powdered form moves by gravity between substantially vertical porous supports 2 disposed across the filtering chamber, the chamber is divided into two compartments 3 and 4 by a transverse partition 5 on both sides of the diaphragm 1. The diaphragm is operated in the usual manner, the filtering medium, in as clean a condition as is practicable, being fed into the passage between the porous supports 2 through a storage space formed by an impervious casing 6 above the upper compartment 3 of the filtering chamber. The porous supports 2 extend to the bottom of the lower compartment 4 of the filtering chamber whence they are continued by an impervious casing 7 enclosing a space in which an extracting worm 8 or other suitable extracting device operates to regulate the velocity of the moving diaphragm and to transfer the filtering medium to a chute 9 delivering it to a screen 10. The dust intercepted by the filtering medium during its passage through the compartments 3 and 4 of the filtering chamber thus falls through the screen 10 into the hopper 11 from which it is removed through suitably arranged and controlled doors indicated at 12. The cleaned filtering medium is delivered from the screen 10 by means of a pipe or the like 13 to a suitable elevator (not illustrated) which re-feeds it to the diaphragm passage by way of a pipe 14 or suitable hopper and the storage space formed by the casing 6.

According to the present invention the gases to be filtered are admitted to the upper compartment 3 of the filtering chamber (i. e., the compartment containing the portion of the diaphragm adjacent to its point of entry to the filtering chamber) by means of a gas main 15 entering the compartment 3 on one side of the diaphragm. On the other side of the diaphragm a suitable conduit 16 leads from the compartment 3 outside the filtering chamber to the lower compartment 4 on the admission side of the diaphragm. Another gas main 17 for conveying the filtered gases from the apparatus leads from the compartment 4 on the other side of the diaphragm 1. The gases are thus filtered in two stages, first passing through a portion of the diaphragm 1 in the upper compartment 3 and then through a second portion of the same diaphragm in the same direction in the lower compartment 4.

In order to prevent the gases from passing through one compartment to another without passing through the diaphragm the porous supports 2 of the diaphragm at the junctions of the partition 5 therewith are made impervious on both sides of the diaphragm as indicated at 18 for an extent sufficient to prevent serious by-pass of the gases vertically down the diaphragm at such junctions. Such impervious sections 18 of the supports 2 preferably extend downwards from the partition as shown so that by sloping the partition 5 as illustrated downwards towards the support 2 on each side of the diaphragm 1 any solid matter falling on to the partition 5 may be returned by gravity through the porous supports 2 into the moving diaphragm. If desired, however, the partition may slope in the opposite direction and such solid matter be removed through a suitable form of trap.

It will be appreciated that during the first stage of filtration in which the gases pass through a clean portion of the diaphragm in the compartment 3 a coarse filtering will be effected. In the case of gases coming directly from a blast furnace, for example, the comparatively large pieces of coke dust will then be deposited in the diaphragm. During the second stage of filtration in the compartment 4 in which the gases pass through a portion of the diaphragm having smaller interstices and a larger surface due to the particles collected in the first stage, a finer filtration will be performed the smaller particles being then deposited, and this process may be repeated until the almost impalpable particles of mineral dust are removed from the gases down to the degree of filtering which this type of moving diaphragm is capable of effecting.

The filtering medium is cleaned, in the apparatus illustrated, after its passage through the filtering chamber and re-fed to the diaphragm passage in a clean condition. It will be obvious however that whereas it is essential that the filtering medium should be re-fed to the diaphragm passage in as clean a condition as possible in the case of the existing type of filtering chamber which is not divided transversely of the diaphragm this is not so necessary in the case of the transversely divided chamber according to this invention as particles of dust blown off the filtering medium on entering the first compartment 3 will be intercepted in the second passage of the gases through the diaphragm in the compartment 4.

The present invention may be applied to various types of filtering apparatus in which a moving diaphragm is disposed in the path of the gases, whether the diaphragm is disposed as a substantially vertical flat or annular wall, or a wall sloping at substantially the natural angle of repose of the filtering medium; and further whether two or more such diaphragms are disposed adjacent to each other.

The present invention may also be applied to filtering apparatus in which the diaphragm moves in a substantially horizontal path, the filtering medium moving on an endless band support and the portion of the band not bearing the filtering medium passing outside the filtering chamber. The transverse division of the filtering chamber would be on both sides of the diaphragm with a flange-like extension parallel to the diaphragm and corresponding to the impervious sections 18 to provide a seal therewith.

What we claim is:—

1. In apparatus for filtering gases comprising a diaphragm moving across a filtering chamber, the method of filtering gases in stages of increasing fineness by passing them through successive portions of the same diaphragm in the same direction, each passage of the gases through the diaphragm being through a portion nearer to its point of entry to the filtering chamber than the succeeding one and each stage being kept separate, substantially as specified.

2. In apparatus for filtering gases comprising a diaphragm moving across a filtering chamber, the combination of a partition on both sides of the diaphragm dividing the chamber transversely to the diaphragm into compartments, means for admitting the gases to the compartment into which the diaphragm first enters, a conduit leading from that compartment on the other side of the diaphragm to the next compartment on the admission side of the diaphragm and means for extracting the gases from the second compartment on the other side of the diaphragm, substantially as specified.

3. In apparatus for filtering gases comprising a diaphragm moving between porous supports across a filtering chamber the combination of a partition on both sides of the diaphragm dividing the chamber transversely to the diaphragm into compartments, impervious portions of the diaphragm supports at and adjacent to the junctions of the partition therewith, means for admitting the gases to the compartment into which the diaphragm first enters, a conduit leading from that compartment on the other side of the diaphragm to the next compartment on the admission side of the diaphragm and means for extracting the gases from the second compartment on the other side of the diaphragm, substantially as specified.

4. In apparatus for filtering gases comprising a diaphragm moving vertically downwards between porous supports across a filtering chamber, the combination of a partition sloping down towards the support on each side of the diaphragm and dividing the chamber transversely to the diaphragm into compartments, impervious portions of the diaphragm supports extending downwards from the partition at its junctions therewith, means for admitting the gases to the compartment into which the diaphragm first enters, a conduit leading from that compartment on the other side of the diaphragm to the next compartment on the admission side of the diaphragm and means for extracting the gases from the second compartment on the other side of the diaphragm, substantially as specified.

In testimony whereof we hereunto affix our signatures.

THOMAS THOMSON.
NICHOLAS NISBET.